(12) United States Patent
Ruhland et al.

(10) Patent No.: US 8,920,530 B2
(45) Date of Patent: *Dec. 30, 2014

(54) FILTER ELEMENT AND FILTER SYSTEM

(75) Inventors: Klaus-Dieter Ruhland, Meckenheim (DE); Michael Kaufmann, Meckenheim (DE)

(73) Assignee: Mann+Hummel GmbH, Ludwigsburg (DE)

( * ) Notice: Subject to any disclaimer, the term of this patent is extended or adjusted under 35 U.S.C. 154(b) by 397 days.

This patent is subject to a terminal disclaimer.

(21) Appl. No.: 13/201,130

(22) PCT Filed: Jan. 20, 2010

(86) PCT No.: PCT/EP2010/050615
§ 371 (c)(1),
(2), (4) Date: Aug. 22, 2011

(87) PCT Pub. No.: WO2010/091917
PCT Pub. Date: Aug. 19, 2010

(65) Prior Publication Data
US 2011/0308212 A1     Dec. 22, 2011

(30) Foreign Application Priority Data
Feb. 11, 2009   (DE) .................. 10 2009 008 450

(51) Int. Cl.
*B01D 46/00*  (2006.01)
*B01D 46/52*  (2006.01)
*B01D 50/00*  (2006.01)
*B01D 46/24*  (2006.01)

(52) U.S. Cl.
CPC ...... *B01D 46/2414* (2013.01); *B01D 2271/022* (2013.01); *B01D 46/521* (2013.01); *B01D 50/002* (2013.01); *B01D 46/0024* (2013.01)
USPC ................. 55/498; 55/502; 55/503; 55/510; 210/450; 210/452; 210/493.2

(58) Field of Classification Search
USPC ............ 55/498, 502, 510, 503; 210/450, 452, 210/493.2
See application file for complete search history.

(56) References Cited

U.S. PATENT DOCUMENTS 4,720,292 A   1/1988   Engel et al.
4,834,885 A   5/1989   Misgen et al.
(Continued)

FOREIGN PATENT DOCUMENTS

DE   102004058481 A1   6/2006
EP       1938731 A1   7/2008
(Continued)

OTHER PUBLICATIONS

DPMA Office Action of DE 10 2009 008 450.9.

*Primary Examiner* — Robert Clemente
(74) *Attorney, Agent, or Firm* — James Hasselbeck

(57) ABSTRACT

The invention relates to a filter element, comprising a filter medium (10) having a concentric shape and pleated in a zig-zag shape, a first open or closed end disk (11) arranged on a face and a second end disk (12) arranged on the opposing face. The end disk (12) comprises a concentric opening (13) and extends in a substantially annular shape over the pleats of the filter medium. The end disk (12) further comprises a first ring bead (14) extending axially to the outside and a sealing groove (16). The ring bead (14) comprises outer faces (18, 19), which are supported on radially extending ribs (20, 21) of a housing receiving the filter element or on a flat surface having channels.

9 Claims, 3 Drawing Sheets

(56) References Cited

U.S. PATENT DOCUMENTS

| | | | |
|---|---|---|---|
| 6,322,602 B2 * | 11/2001 | Engel et al. | 55/428 |
| 6,716,264 B2 * | 4/2004 | Onoda | 55/385.3 |
| 7,083,661 B2 * | 8/2006 | Hasegawa et al. | 55/498 |
| 7,455,707 B2 * | 11/2008 | Engel et al. | 55/428 |
| 7,524,349 B2 * | 4/2009 | Schrage et al. | 55/502 |
| 7,628,837 B2 * | 12/2009 | Ehrenberg | 55/498 |
| 7,815,705 B2 * | 10/2010 | Ehrenberg | 55/502 |
| 7,981,186 B2 * | 7/2011 | Schrage et al. | 55/498 |
| 8,142,533 B2 * | 3/2012 | Gillenberg et al. | 55/337 |
| 8,147,576 B2 * | 4/2012 | Gillenberg et al. | 55/337 |
| 8,286,804 B2 * | 10/2012 | Weindorf | 210/505 |
| 8,287,612 B2 * | 10/2012 | Gillenberg et al. | 55/337 |
| 8,361,181 B2 * | 1/2013 | Osendorf et al. | 55/498 |
| 8,480,778 B2 * | 7/2013 | Baseotto et al. | 55/498 |
| 2002/0116909 A1 * | 8/2002 | Onoda | 55/498 |
| 2005/0211623 A1 * | 9/2005 | Moscaritolo et al. | 210/440 |
| 2006/0254229 A1 * | 11/2006 | Schrage et al. | 55/498 |
| 2011/0094197 A1 * | 4/2011 | Ruhland et al. | 55/498 |

FOREIGN PATENT DOCUMENTS

| | | |
|---|---|---|
| GB | 1099122 A | 1/1968 |
| GB | 1253354 A | 11/1971 |
| WO | WO 2009047196 A1 * | 4/2009 |

* cited by examiner

FILTER ELEMENT AND FILTER SYSTEM

CROSS REFERENCE TO RELATED APPLICATIONS

This application is US National Stage Entry of international patent application no. PCT/EP2010/050615, filed Jan. 20, 2010 designating the United States of America. Priority is claimed based on German patent application no. 10 2009 008 450.9, filed Feb. 11, 2009.

TECHNICAL FIELD

The invention concerns a filter element and a filter system, in particular for the intake air of an internal combustion engine.

PRIOR ART

U.S. Pat. No. 4,720,292 discloses an air filter with the following features: a housing with an axial outlet opening and a substantially open second end that is closable by a removable cover. On the circumference of the housing an air inlet opening is arranged. A substantially cylindrical filter element is arranged in the housing and has an inner support pipe, a filter with an outer support pipe, wherein the filter element is coaxially arranged in the housing. The sealing action of the filter element relative to the housing is realized by an annular end disk that is provided with a substantially cylindrical surface that is inwardly oriented in radial direction and is pushed across an inner section of the outlet part.

It is known that filter inserts of air filters are exchanged after a certain service life. Depending on the dust load, the service life of an air filter can be a few days (construction machinery) up to several months.

The filter insert disclosed in the above-mentioned U.S. patent as well as other conventionally employed filter inserts are comprised of a combination of materials wherein in particular for the support pipes sheet steel or plastic material is used. The filter medium is paper or a synthetic nonwoven. The end disks are comprised of plastic material, for example, of a soft elastomer.

Especially in case of frequent exchange of filter elements a reliable and process-safe sealing action of the filter element in a housing is important. The sealing action should be designed to be temperature-resistant and resistant to vibrations. In facilities or devices that are subjected to strong vibrations or shaking action, the sealing action of the filter element must also be ensured. At the same time, however, the filter element itself should have no metallic elements so that it can be thermally disposed off without problems.

SUMMARY OF THE INVENTION

The invention therefore has the object to provide a filter element and a filter system with excellent filtration properties and a reliable sealing action between the area of the unfiltered and the area of the filtered medium. This object is solved by the features of the independent claim.

The important advantage of the invention resides in that by the configuration of the seals of the filter element with two annular bead-shaped arrangements and a sealing groove positioned therebetween it is ensured that, on the one hand, a high sealing effect and, on the other hand, an excellent support action of the filter element in a housing are achieved. Particularly when using plastic material for the seal on vibration-loaded elements, a design is required that operates reliably even under extreme temperature fluctuations.

According to the invention, the housing can also have passages that are arranged on the flat surface on which the annular bead is resting. These passages, for example, have the task of discharging dust.

According to a further embodiment of the invention the end disk that supports the seal is comprised of polyurethane. Of course, there is also the possibility to produce the end disk of a soft elastomer or of several components, for example, by means of in-mold assembly by injection molding, wherein the component that forms the seal is comprised of an elastomer and the component that produces the connection to the filter medium is a thermoplastic material. The latter can be fused or glued to the filter medium.

In a further embodiment of the invention, it is proposed to arrange dust passages on the filter system where it is required to keep the sealing surfaces, in contact with the filter element, free of dust.

According to a further embodiment, ribs can be arranged on the filter-receiving housing or also on a web. There is also the possibility to arrange ribs and/or grooves on the housing at locations where this support action or passing-through of certain materials through the grooves is required.

The invention concerns moreover a filter system with a filter element. This filter system serves in particular for filtration of intake air of an internal combustion engine and is comprised of a housing and a cover for receiving the filter element. In an advantageous way, the filter system is provided with two annular grooves that, in the area of the seal, communicate with the sealing contours of the filter element. At the same time, in this area additional support webs or grooves are provided that extend, for example, radially and have a support action or a through-opening function.

These and further features are not only disclosed in the claims but can also be taken from the figure description and the figures.

BRIEF DESCRIPTION OF THE DRAWINGS

The invention will be explained in the following in more detail with one embodiment. It is shown in.

DETAILED DESCRIPTION

Figure 1:
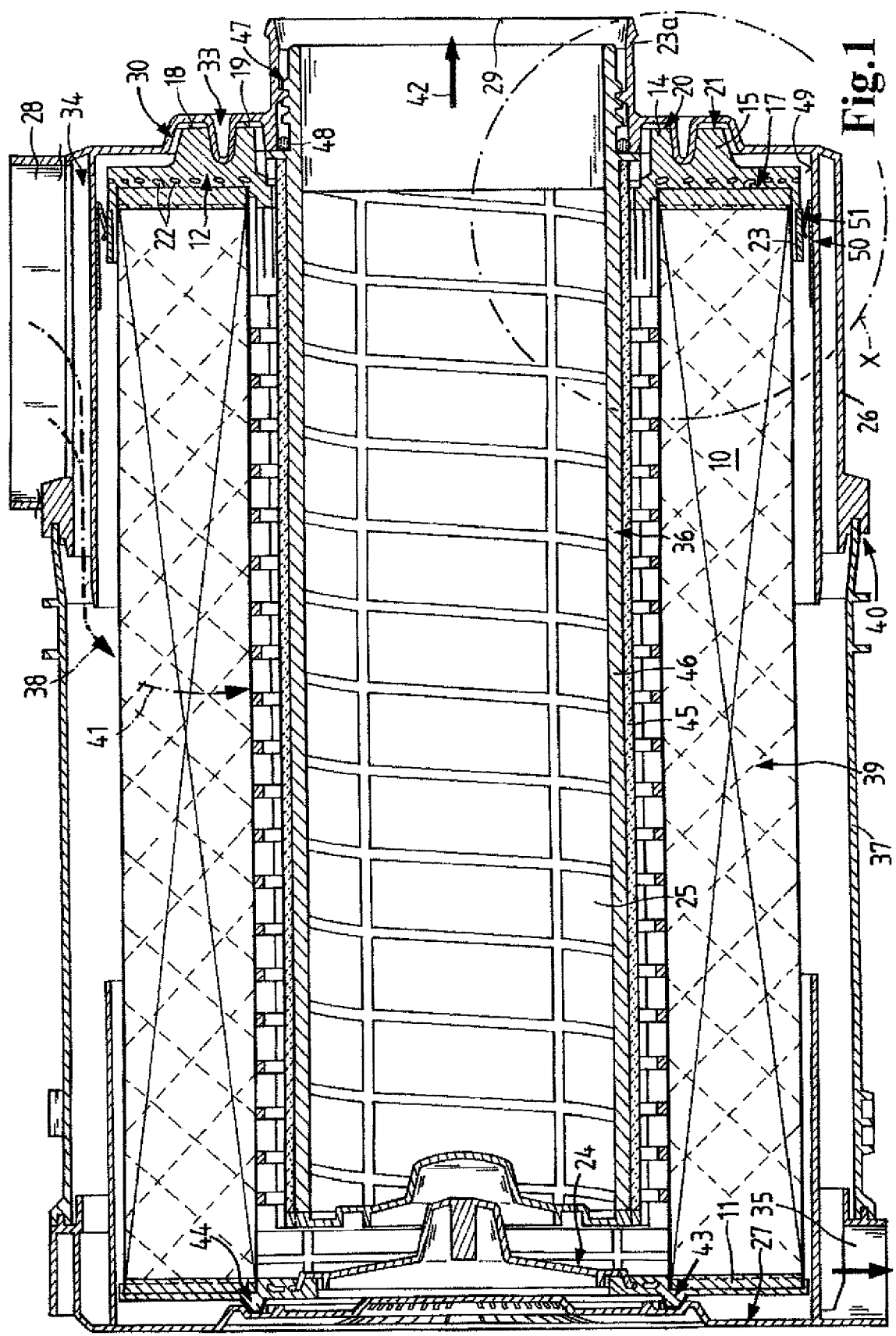
FIG. 1 a section through a filter system.
Figure 1A:
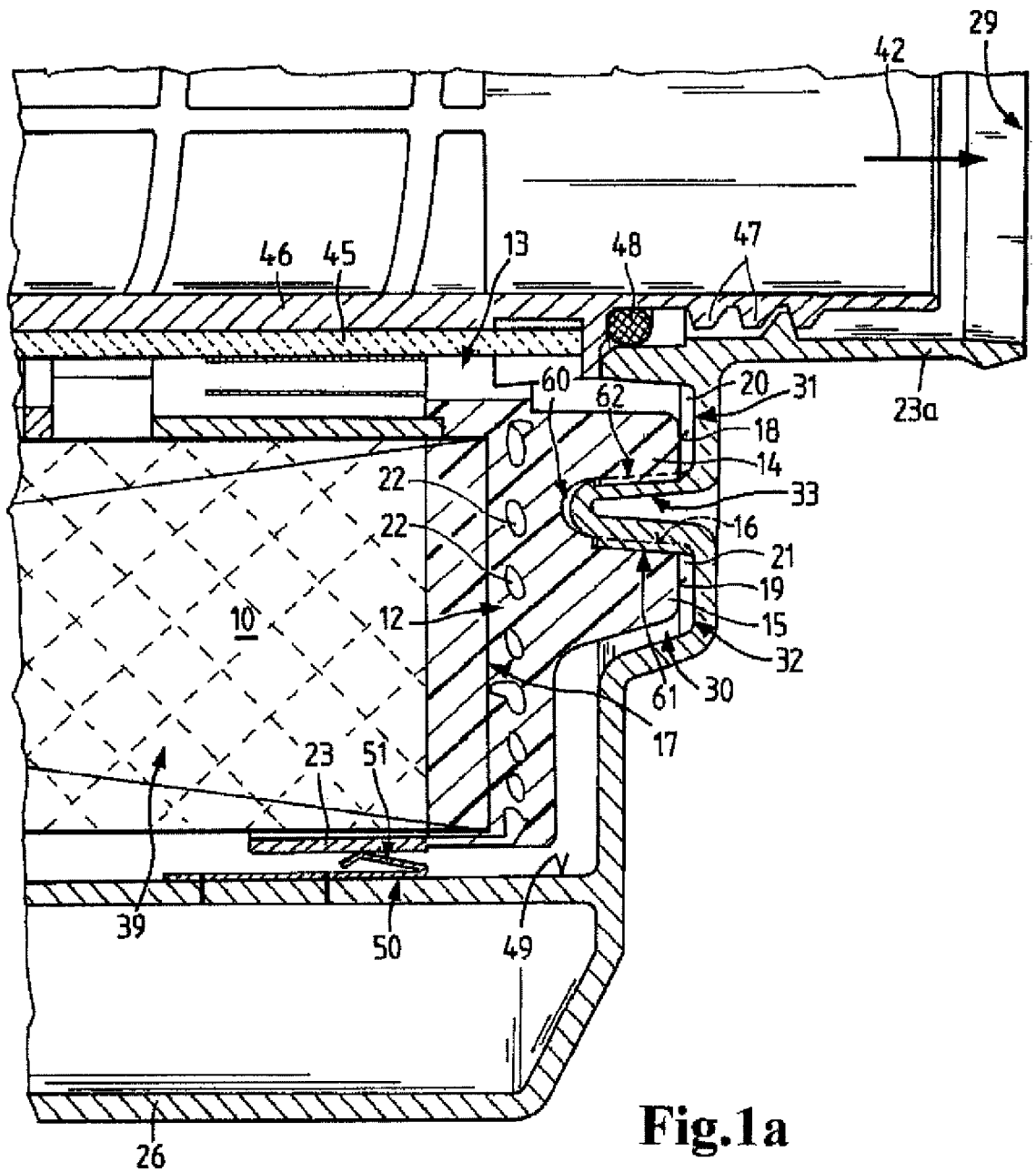
FIG. 1a a detail view of FIG. 1.

The filter system according to FIG. 1 is comprised of a housing 26 that is substantially concentrically configured and has an inlet 28. The filter system serves for filtering intake air of an internal combustion engine. By means of the inlet 28 the air to be purified is supplied according to arrow 38, flows through a cyclone pre-separator 34 and is imparted therein with a rotary flow action. As a result of this rotary flow action, particles that are entrained in the air reach the outer housing walls and are transported from there to the exterior through a dirt outlet 35 that can be closed off by a suitable valve.

On the housing 26 a central part 37 is arranged. The latter is also concentrically designed and is coupled with the housing in the area 40, for example, by means of a weld connection. On the central part 37 there is a cover 27. The latter is detachably connected to the central part by means of clamp closure devices or another suitable closure system. Cover, central part and housing therefore provide a closed system that has an outlet 29 for discharging the purified air.

Within the system as a whole there is a filter element 39. The latter is comprised of a zigzag-shaped folded filter medium 10 and is designed of a concentric shape. On the end faces the filter element 39 has end disks 11, 12. While one end disk 12 has a concentric opening 13, the other end disk 11 is closed off by means of a closure member 24. There is also the possibility to provide the additional end disk with a concentric opening that is closed off by a socket at the cover 27. The air to be purified flows according to arrow 41 through the filter element and according to arrow 42 exits purified through the outlet 29 to an internal combustion engine, not illustrated here. The filter element has at the end disk 12 arranged to the right a first annular bead 14 and a second annular bead 15. Therebetween a sealing groove 16 is located.

Within the end disk 12 a reinforcement plate 17 is provided. The latter has penetrations 22. The reinforcement plate is provided in the outer area, i.e., outside of the sealing material area, with an annular surface 23. The latter serves for shielding the filter medium or the element during assembly or when knocking off dust or when being manually handled in other ways.

The annular bead 14 as well as the annular bead 15 impact on ribs 20, 21 and define thus the axial position of the filter element in the housing. The axial bead end faces (18, 19) of the annular beads (14, 15) can lie in the same plane and abut against and be supported on the radially outwardly extending ribs (20, 21) of a housing receiving the filter element or on a planar surface with passages.

In an alternative embodiment, not limited to this example, the position of the filter element can be defined by engagement of the annular beads 14 and 15 in annular grooves 31 and 32—without contacting the ribs 20, 21. Alternatively, also other locations can be used for additional axial and/or radial fixation.

Figure 2:
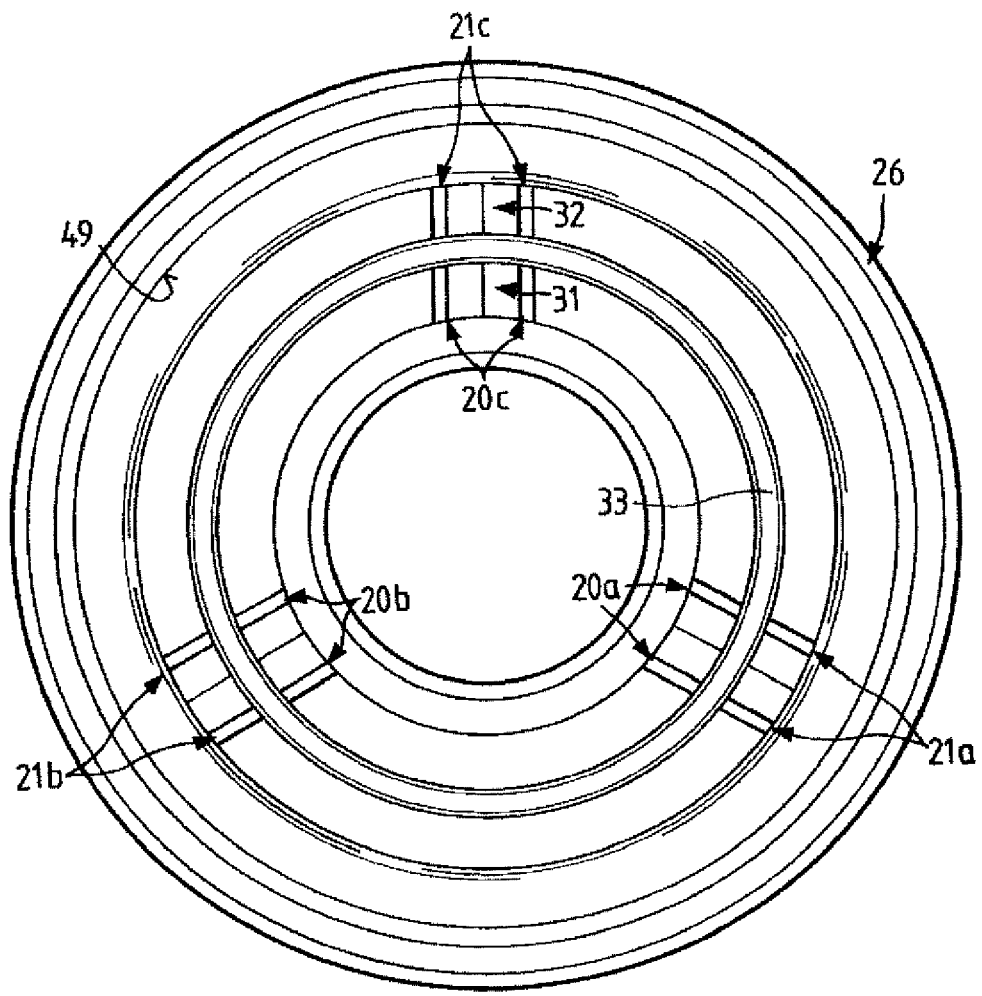
FIG. 2 the detail illustration in the sealing area of the filter housing.

The ribs are illustrated in more detail in FIG. 2; they are so-called double ribs, i.e., two neighboring ribs 20a, 20b, 20c that are arranged at the groove bottom of the annular groove 31 and at the groove bottom of the annular groove 32 and, for example, have a height of 3 to 6 mm.

The sealing web 33 is provided in the upper area with one or several grooves or webs. There is also the possibility, as indicated by reference character 61, to provide a web 61 additionally on one side of the sealing web 33 or, as indicated with reference character 62, a groove on the web 33. Of course, basically one has to take care that a circumferentially extending sealing action of the filter element in the housing is ensured. The illustrated webs as well as the grooves are only examples for the support action at certain locations, in particular a support action of the filter element, or a passage configuration that is expedient for discharging dirt or the like.

The illustrated features of FIG. 2 can also be grooves 20a, 20b, 20c or 21a, 21b, 21c that are arranged in any arrangement in the sealing area. The filter element is supported reliably in the sealing area. An arrangement of ribs prevents a rotation of the filter element in case of transverse frequency excitation. The sealing structure improves at the same time the entire connection between the housing and the filter element.

The sealing web 33 that is located between the two annular grooves has the sealing area provided on its flanks; here, the end disk 12 seals with its sealing groove 16. Therefore, there is a double sealing principle by means of these two flanks. The sealing groove 16 is minimally deeper than the sealing web 33 so that a certain axial tolerance is possible in this area. As already mentioned, the end disk is comprised of a polyurethane foam or another elastomer whose hardness is selected such that, on the one hand, it provides the required sealing forces and, on the other hand, also ensures good positioning of the filter element in the filter housing. By means of the two-flank sealing action and the support action of the annular beads 14, 15 on the ribs 20, a relatively minimal mounting force and also minimal release force for exchange of the filter element is required.

In an alternative embodiment, not limited to this example, the sealing web 33 has at its axial end an additional sealing bead, for example, an annular structure that is extending on the sealing web 33 and is axially oriented into the interior of the housing. In this way, an additional axial sealing action can be achieved without affecting the pressing force when mounting the filter element in the filter housing. This can be provided, for example, by means of a sealing bead that is thin in comparison to the sealing web 33.

The end disk 11 is provided with support noses 43, 44. The latter are supported on the cover 27 and ensure thus a satisfactory axial force in the direction of the end disk 12 and thus a reliable sealing action. In the end disk 12 a closure member 24 is embedded. It separates the raw air space from the clean air space. Within the filter element there is a secondary element 36 that surrounds the interior 25. The purified air flows through the secondary element that usually comprises a nonwoven pad 45. The nonwoven pad is attached to a thermoplastic or metallic base member 46. The secondary element 36 is attached by means of a thread 47 on the outlet socket of the outlet 29 and, at the same time, sealed by means of an O-ring 48 in this area.

The housing 26 is provided with an inner wall 49. This inner wall has a minimal spacing relative to the annular surface 23. At this inner wall a clamping element 50 is provided.

This clamping element is comprised of spring steel that is shaped at several locations and projects into the mounting space of the filter element. The shaped locations are illustrated in FIG. 1 and are identified by reference character 51. Upon insertion of the filter element the shaped locations are pushed outwardly and serve for centering the filter element. Should a filter element without the annular surface 23 be inserted into the housing, there is no possibility of centering the filter element. In this case, the filter element or the filter medium would possibly be damaged. Therefore, the clamping element serves as a protection against accidental installation of a wrong or faulty filter element.

The invention claimed is:
1. A filter element comprising:
   a zigzag-shaped folded filter medium arranged in concentric shape and having an open interior;
   a first end disk arranged on an end face of said concentric shape filter medium, said first end disk open or closed to said open interior;
   a second end disk arranged on an opposite end face of said concentric shape filter medium;
   wherein said second end disk has concentric opening extending though said second end disk,
   wherein said second end disk extends substantially in an annular ring-shape about the folds of said filter medium,
   wherein said second the end disk includes
      a plurality of axially outwardly extending annular beads, said annular beads arranged concentrically on said second end disk;
      at least one sealing groove provided on said second end disk, said at least one sealing groove concentric with and positioned between adjacent ones of said plurality of axially outwardly extending annular beads; and an axial bead end face arranged on each of said plurality of axially outwardly extending annular beads at an axial outwardly most axial portion of said annular beads;

wherein said axial bead end faces lie in the same plane, said axial bead end faces abut against and are supported on radially outwardly extending ribs of a housing receiving the filter element or on a planar surface with passages;

wherein the first end disk includes axially projecting support noses, the support noses arranged on the first end disk and project axially outwardly away from the first end disk and the filter medium, the support noses operable to engage axially against and push against an interior of the housing to provide axial support to the filter element.

2. The filter element according to claim 1, wherein said second end disk is comprised of a polyurethane foam or an elastomer.

3. The filter element according to claim 1, wherein said passages of the receiving housing are dust passages operable to transport diverted dust particles to exit the housing.

4. The filter element according to claim 1, wherein the housing in the area of a groove bottom of the at least one sealing groove has at least one rib.

5. The filter element according to claim 1, wherein the receiving housing has a circumferentially arranged sealing web that is provided with ribs and/or grooves on said sealing web on a topside surface and/or on a web flank surface and/or on a web bottom surface.

6. A filter system comprising:
a filter element comprising:
   a zigzag-shaped folded filter medium arranged in concentric shape and having an open interior;
   a first end disk arranged on an end face of said concentric shape filter medium, said first end disk open or closed to said open interior;
   a second end disk arranged on an opposite end face of said concentric shape filter medium;
   wherein said second end disk has concentric opening extending though said second end disk,
   wherein said second end disk extends substantially in an annular ring-shape about the folds of said filter medium,
   wherein said second the end disk includes
      a plurality of axially outwardly extending annular beads, said annular beads arranged concentrically on said second end disk;
      at least one sealing groove provided on said second end disk, said at least one sealing groove concentric with and positioned between adjacent ones of said plurality of axially outwardly extending annular beads; and
      an axial bead end face arranged on each of said plurality of axially outwardly extending annular beads at an axial outwardly most axial portion of said annular beads;
   wherein said axial bead end faces abut against and are supported on radially outwardly extending ribs of a housing receiving the filter element or on a planar surface with passages;
   wherein the first end disk includes axially projecting support noses, the support noses arranged on the first end disk and project axially outwardly away from the first end disk and the filter medium, the support noses operable to engage axially against and push against an interior of the housing to provide axial support to the filter element;
a housing having an interior into which said filter element is received, said housing substantially concentrically configured;
a cover secured to and closing off said interior of said housing, said housing with said secured cover fully enclosing said filter element, said housing and said cover also concentrically configured;
an inlet arranged on said housing and/or on said cover supplying the medium to be filtered into said filter element in said interior;
an outlet concentrically arranged on said housing discharging the filtered medium from said filter element;
a sealing contour provided on said housing, said sealing contour corresponding to said at least one annular beads and said at least one sealing groove;
wherein said sealing contour is comprised of two concentrically extending annular grooves and a sealing web arranged between said two annular grooves,
wherein said annular grooves on said groove bottom have ribs and/or grooves and said sealing web has a height that is smaller than said sealing groove of said filter element.

7. The filter system according to claim 6, wherein a clamping element is circumferentially arranged on an inner wall of said housing, said clamping element projecting into said interior of said housing and pushing radially against an annular surface of said filter element end disk.

8. The filter system according to claim 6, wherein said at least one sealing groove provided on said second end disk is concentric with and positioned between adjacent ones of said plurality of axially outwardly extending annular beads;
wherein the housing includes an axially inwardly extending annular sealing web, wherein the sealing web has an axially extending flank sidewall that seals with the sealing groove of said second end disk; and
wherein at least one rib is arranged on said flank sidewall of said axially inwardly extending annular sealing web of said housing; or at least one groove is arranged into said flank sidewall of said axially inwardly extending annular sealing web of said housing.

9. The filter system according to claim 6, wherein the first end disk includes axially projecting support noses, the support noses arranged on the first end disk and project axially outwardly away from the first end disk and the filter medium, the support noses engaging axially against and pushing against an interior of the housing providing axial support to the filter element.

* * * * *